(12) United States Patent
Dare-Bryan (10) Patent No.: US 7,500,687 B2
(45) Date of Patent: Mar. 10, 2009

(54) VEHICLE SUSPENSION SYSTEMS

(75) Inventor: Valerian John Dare-Bryan, Bury St. Edmunds (GB)

(73) Assignee: Lockheed Martin Corporation, Bethesda, MD (US)

( * ) Notice: Subject to any disclaimer, the term of this patent is extended or adjusted under 35 U.S.C. 154(b) by 271 days.

(21) Appl. No.: 11/363,633

(22) Filed: Feb. 28, 2006

(65) Prior Publication Data

US 2006/0138741 A1 Jun. 29, 2006

(51) Int. Cl.
*B60G 7/02* (2006.01)
*B60G 11/28* (2006.01)

(52) U.S. Cl. ................... 280/124.109; 280/124.157

(58) Field of Classification Search ........ 280/124.109, 280/124.134, 124.135, 124.136, 124.151, 280/124.155, 124.157
See application file for complete search history.

(56) References Cited

U.S. PATENT DOCUMENTS

| 5,080,389 A | * | 1/1992 | Kawano et al. ....... 280/124.142 |
| 5,085,457 A | | 2/1992 | Young |
| 5,505,481 A | | 4/1996 | VanDenberg et al. |
| 5,700,025 A | * | 12/1997 | Lee ........................ 280/86.751 |
| 5,704,632 A | | 1/1998 | Lee |
| 7,090,234 B2 | * | 8/2006 | Takayanagi et al. ... 280/124.103 |
| 2006/0138741 A1 | | 6/2006 | Dare-Bryan |
| 2006/0237251 A1 | * | 10/2006 | LeBlanc, Sr. et al. ....... 180/252 |

FOREIGN PATENT DOCUMENTS

| GB | 580 065 | 8/1946 |
| GB | 988 199 | 4/1965 |
| GB | 1 375 339 | 11/1974 |
| GB | 2 207 646 A | 2/1989 |
| GB | 2 236 287 A | 4/1991 |

* cited by examiner

*Primary Examiner*—Eric Culbreth
*Assistant Examiner*—Barry Gooden, Jr.
(74) *Attorney, Agent, or Firm*—Miles & Stockbridge PC; James T. Carmichael (57) ABSTRACT

A vehicle suspension system includes an airbag (10) arranged to act substantially horizontally so as to apply a substantially horizontal force to a horizontally movable force-transmitting member (12) and a parallelogram linkage (16, 17, 18, 19) that acts between the force-transmitting member (12) and a part (14) of the vehicle chassis (10).

6 Claims, 7 Drawing Sheets

VEHICLE SUSPENSION SYSTEMS

FIELD OF THE INVENTION

This invention relates to vehicle suspension systems.

Vehicle suspension systems are known that include a vertically acting air bag.

However, the use of a vertically acting air bag imposes space and design restraints on the suspension system and it is accordingly an object of the present invention to provide a vehicle suspension system that includes the use of an air bag that acts substantially horizontally.

SUMMARY OF THE INVENTION

According to the present invention there is provided a vehicle suspension system for a vehicle having a chassis, the suspension system including:— a) a horizontally movable force-transmitting member, b) an airbag arranged to act substantially horizontally so as to apply a substantially horizontal force to the horizontally movable force-transmitting member, c) a parallelogram linkage that acts between the force-transmitting member and a part of the vehicle chassis, d) the parallelogram linkage including a rocker pivotally connected at its one end to said part of the vehicle chassis for pivotal movement relative thereto about a substantially horizontal pivot axis, and e) a push rod connected at its one end to the rocker at a position intermediate the ends of the rocker.

The rocker is preferably pivotally connected at its other end to the force-transmitting member or to a component fixed to the force-transmitting member, and the push rod is preferably connected at its other end to a wheel hub support member suspended from the vehicle chassis by suspension links.

This arrangement provides for optimum vertical wheel displacement and variable ride height ability.

Two airbags may be mounted on the chassis so as to act transversely of the axis of the vehicle chassis, the airbags being disposed in a substantially back-to-back manner. This provides a balanced arrangement and avoids the application of torsional twisting loads to the chassis.

DESCRIPTION OF THE PREFERRED EMBODIMENTS

As can be seen from the drawings, the suspension system includes an air bag 10 mounted on the vehicle chassis 11 and arranged to act horizontally so as to apply a resilient force to an air bag mounting plate 12 that carries a pivot mounting 13. A part 14 of the chassis 11 carries a mounting 15 for a main pivot for one arm of a rocker 16. The other arm of the rocker 16 is attached to pivot mounting 13. The air bag 10 extends transversely to the centre line or axis of the vehicle chassis 11 and acts outwardly of the centre line of the chassis 11.

The rocker 16 forms part of a parallelogram linkage system that also includes a first link 17, a second link 18 and a third link 19. One end of the first link 17 is connected to the mounting 15 and the other end of the first link 17 is connected to one end of the second link 18. The other end of the second link 18 is connected to one end of the third link 19 and the other end of the third link 19 is connected, in turn, to the pivot mounting 13.

Figure 1:
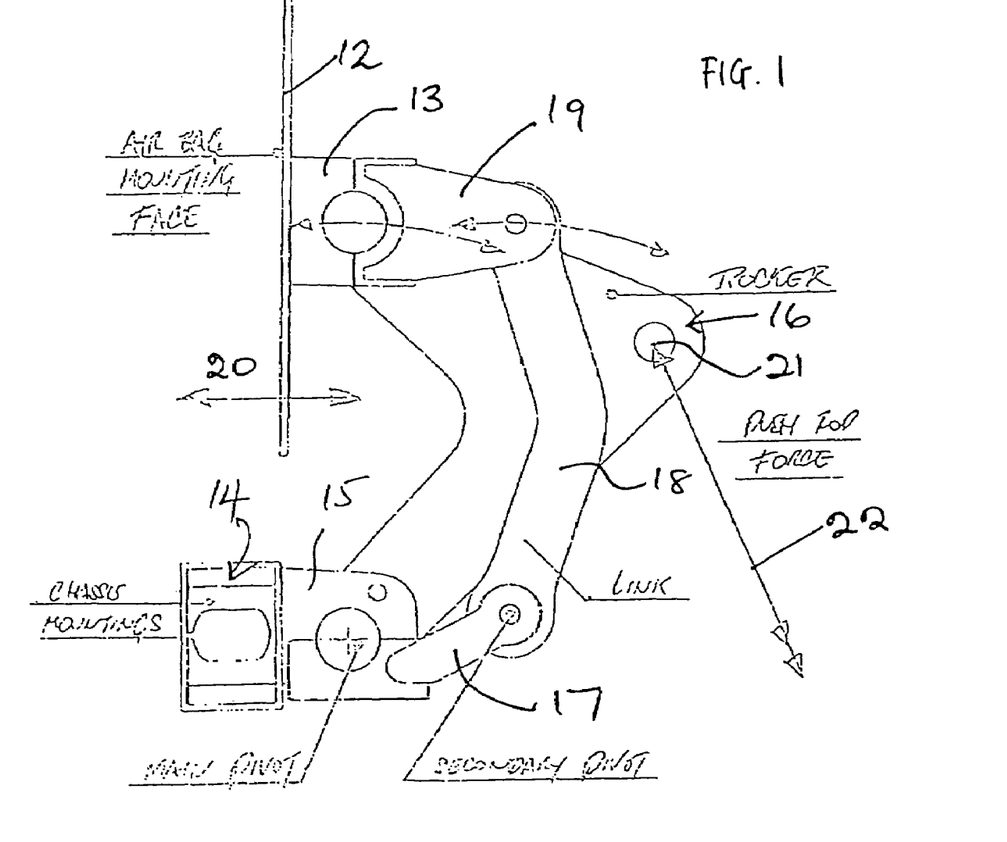
FIG. 1 is a schematic side view of a vehicle suspension system in accordance with the present invention.

The action of the parallelogram linkage system 16, 17, 18, 19 is such that, as the air bag mounting plate 12 moves horizontally, as indicated by the arrow 20 in FIG. 1, tilting movement of the air bag mounting plate 12 is prevented and the action of the air bag 10 is maintained horizontally.

The rocker 16 carries a pivot mounting 21 for a push rod 22 that is connected to a mounting 23 for a road wheel hub 24, and the mounting 23 is supported by suspension links 25 connected to the chassis 10. As shown in the drawings, a shock absorber 27 acts between the lower suspension link 25 and the chassis 11.

The parallelogram linkage system 16, 17, 18, 19 connecting the chassis mounting 15 and the pivot mounting 13 carried by the air bag mounting plate 12 permits substantial, controlled vertical displacement of the road wheel hub 24 and the mounting 23 and provides for variable ride height.

Figure 2:
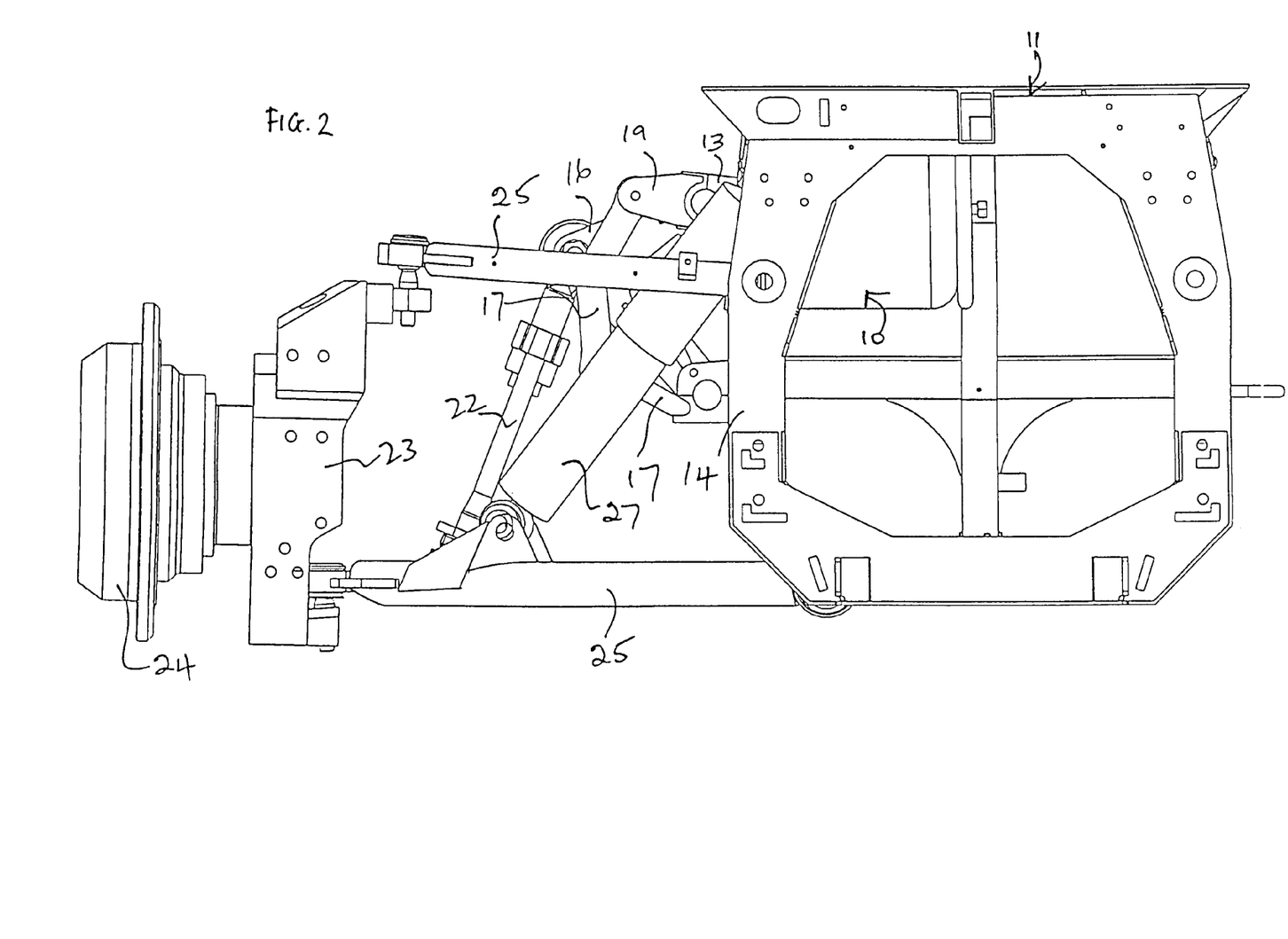
FIG. 2 is a front view of a first form of suspension system mounted on the chassis of a vehicle having a hub assembly drive system.
Figure 3:
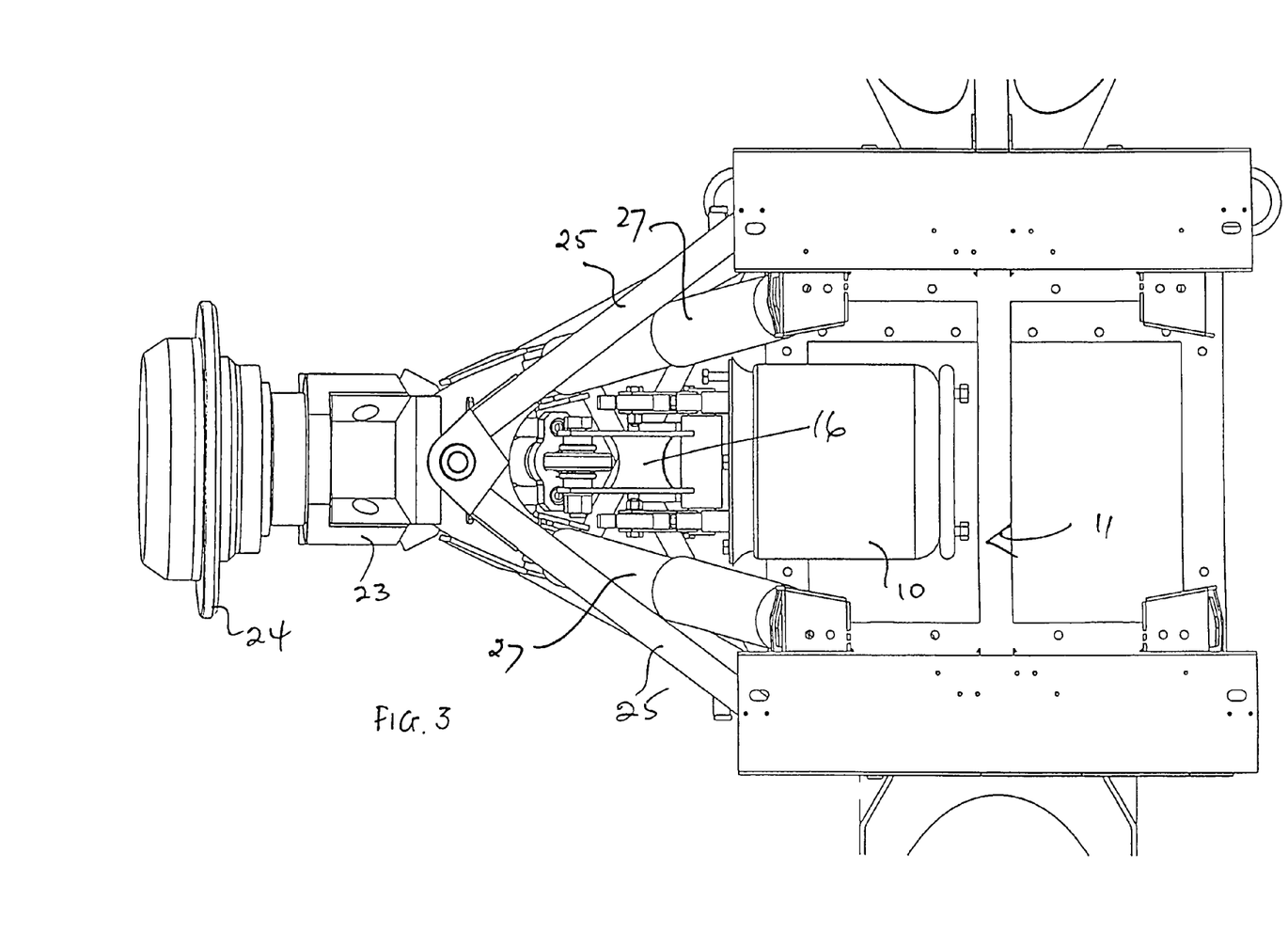
FIG. 3 is a plan view of the chassis, suspension system and drive system shown in FIG. 2.
Figure 4:
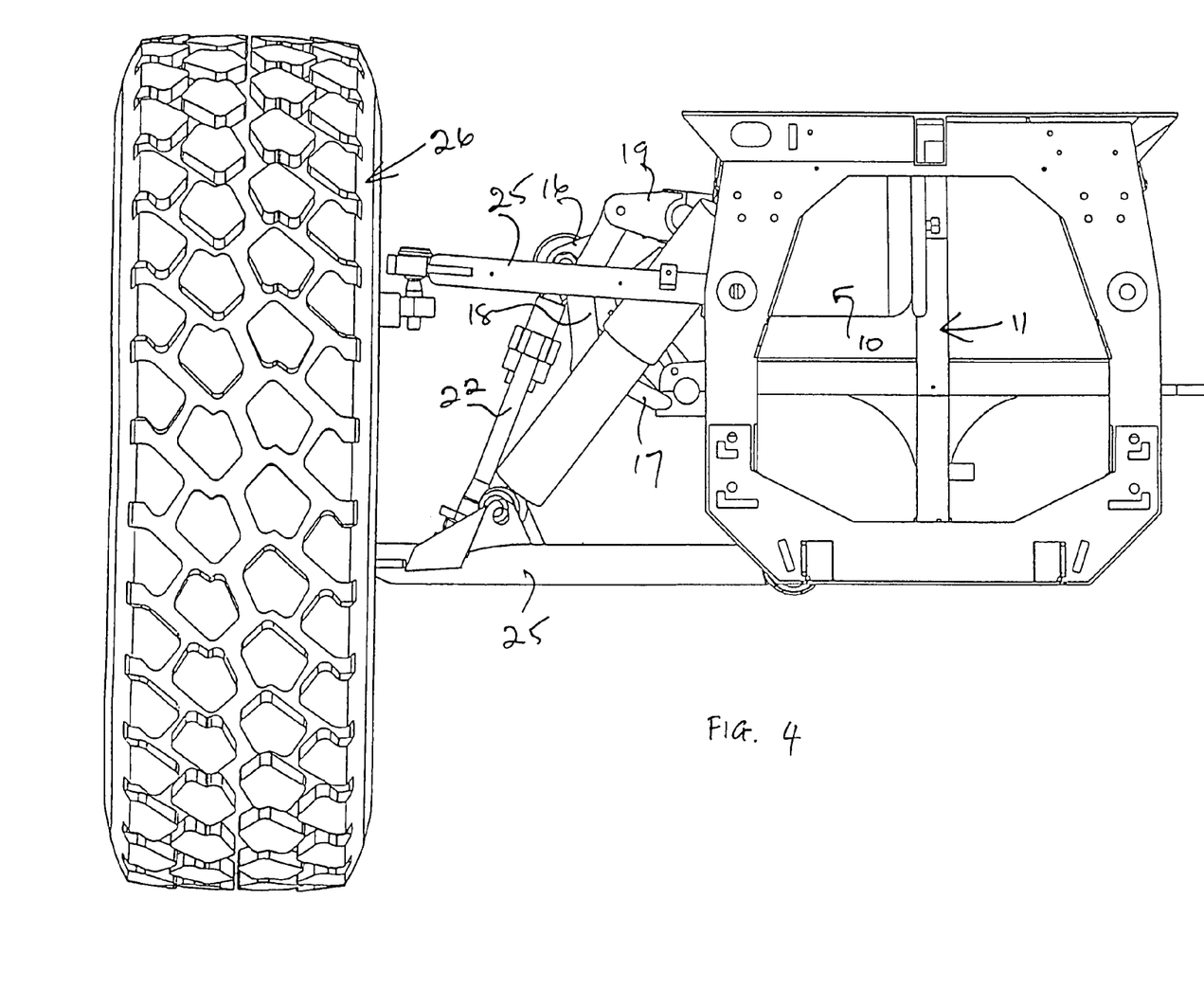
FIG. 4 is a side view corresponding to FIG. 2 but showing a wheel mounted on the hub assembly.
Figure 5:
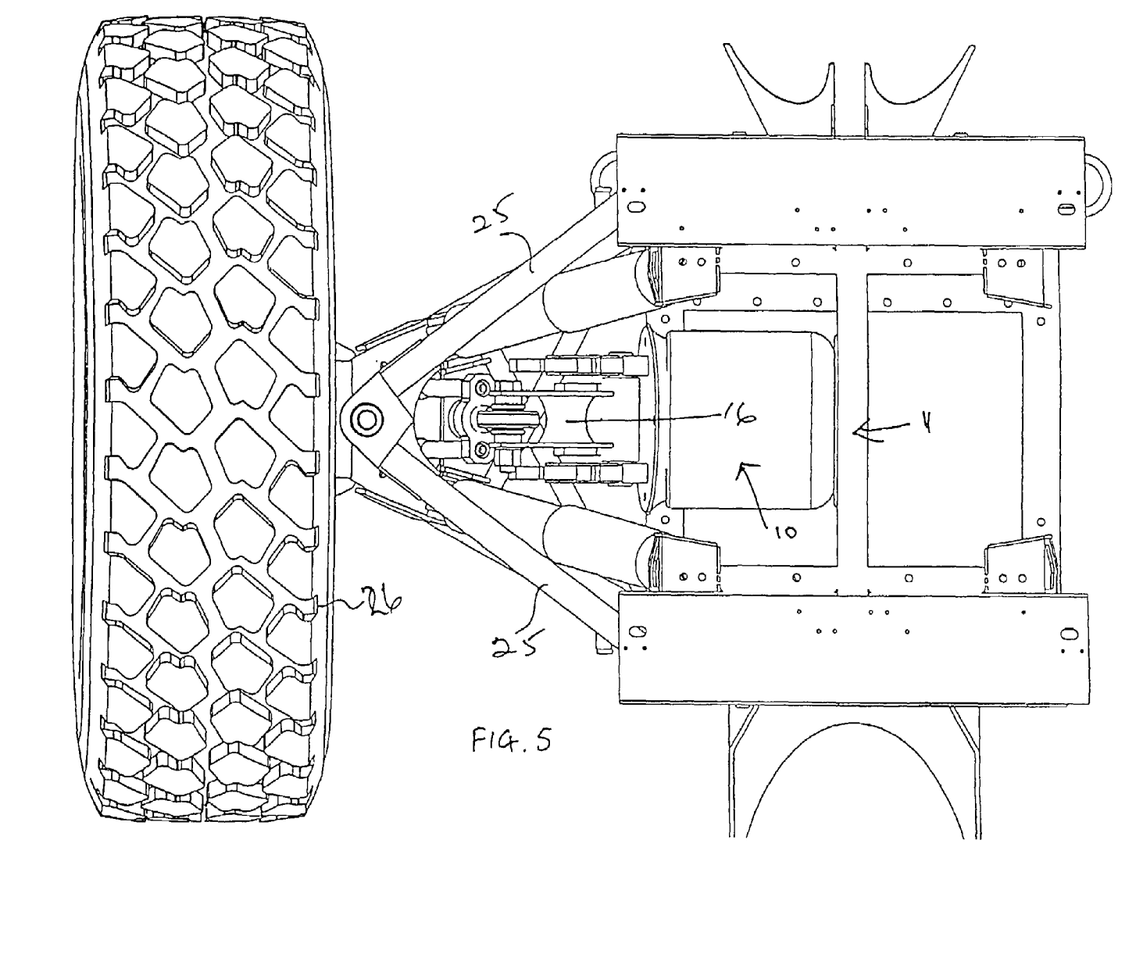
FIG. 5 is a plan view corresponding to FIG. 3 but showing a wheel mounted on the hub assembly.
Figure 6:
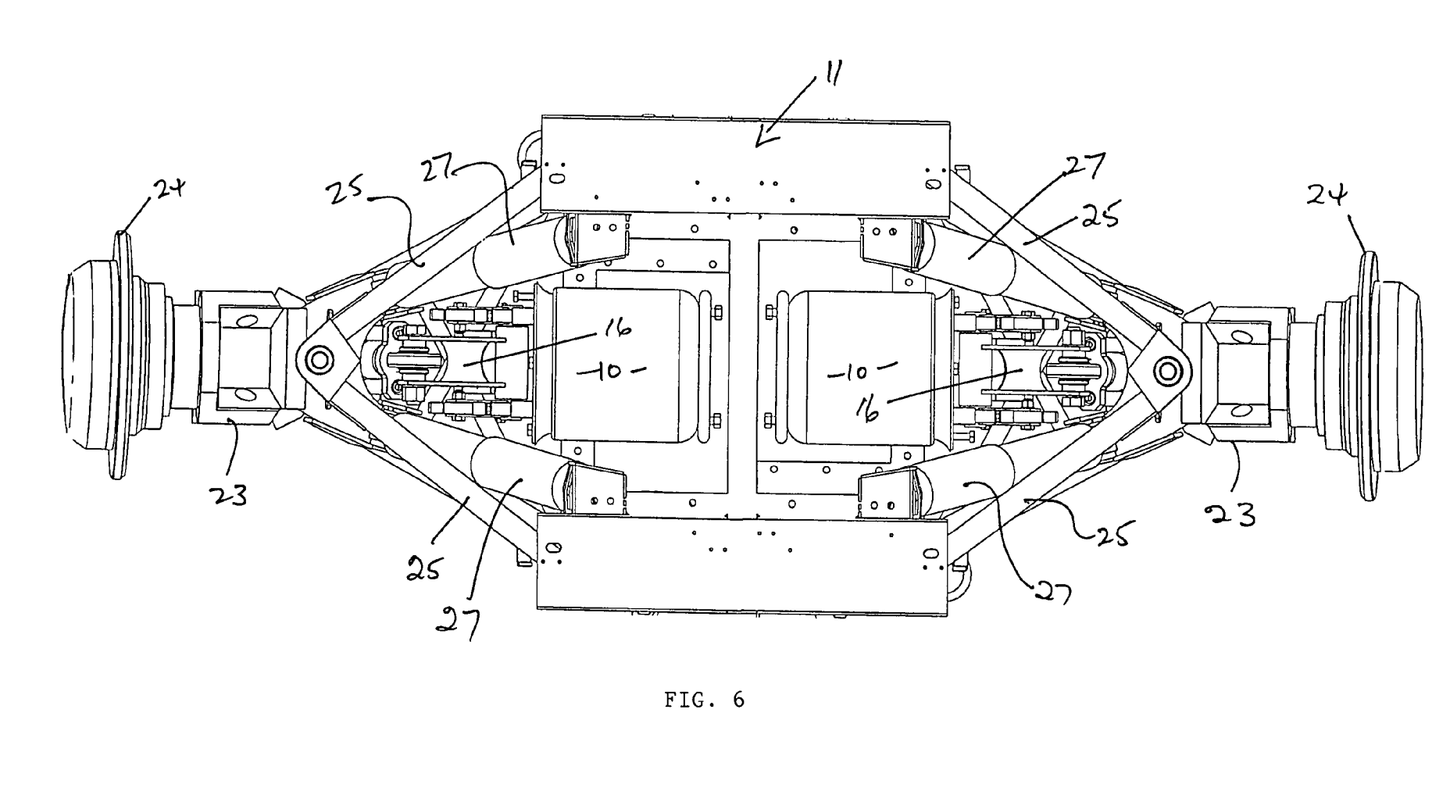
FIG. 6 is a plan view of a vehicle suspension system that includes two air bags arranged back-to-back.
Figure 7:
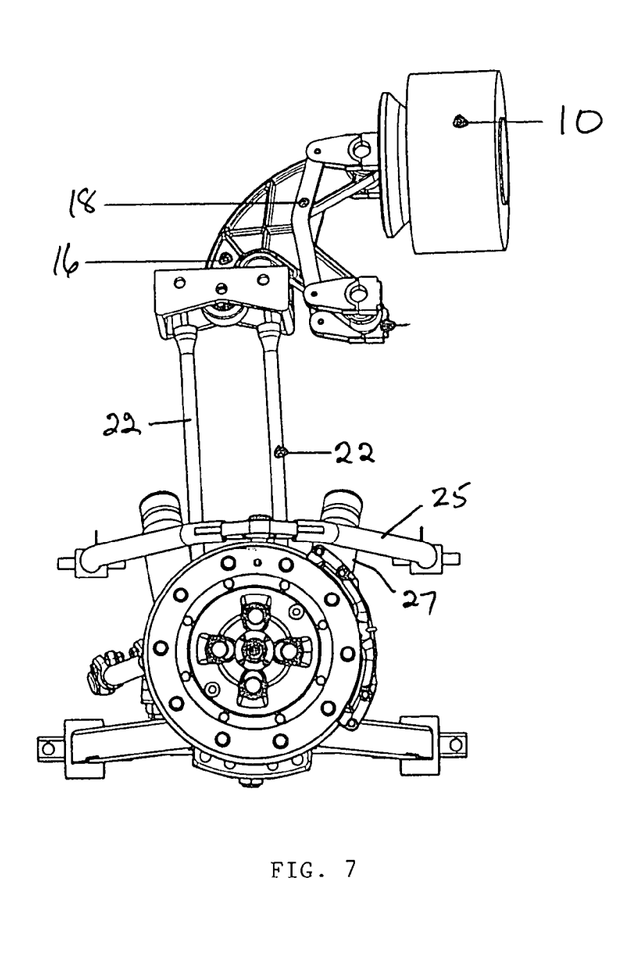
FIGS. 7 and 8 are perspective views of a front or rear axle suspension system that includes a longitudinally acting air bag.
Figure 8:
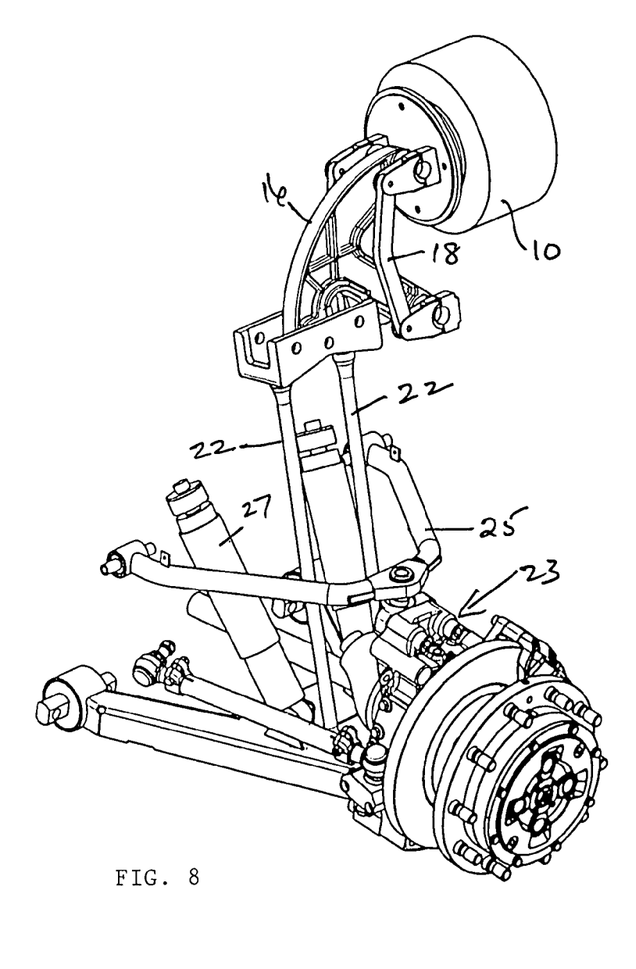

FIGS. 4 and 5 show a wheel 26 mounted on the road wheel hub 24. The wheel 26 has not been shown in FIGS. 2 and 3 in order to enable details of the wheel hub 24 and the mounting 23 to be seen.

The drawings show the suspension system for a single wheel 26 of the vehicle and it will be appreciated that there will be another suspension system of mirror image form on the other side of the vehicle. This arrangement will then be repeated for each pair of wheels 26 of the vehicle.

Two airbags 10 will thus be mounted on the chassis 11 so as to act transversely of the axis of the vehicle chassis 11 and will be disposed in a substantially back-to-back manner. This provides a balanced arrangement and avoids the application of torsional twisting loads to the chassis 11.

The invention claimed is:

1. A vehicle suspension system for a vehicle having a chassis, the suspension system including:— a) a horizontally movable force-transmitting member, b) an airbag arranged to act substantially horizontally so as to apply a substantially horizontal force to the horizontally movable force-transmitting member, c) a parallelogram linkage that acts between the force-transmitting member and a part of the vehicle chassis, d) the parallelogram linkage including a rocker pivotally connected at its one end to said part of the vehicle chassis for pivotal movement relative thereto about a substantially horizontal pivot axis, and e) a push rod connected at its one end to the rocker at a position intermediate the ends of the rocker.

2. A vehicle suspension system as claimed in claim 1, in which the rocker is pivotally connected at its other end to the force-transmitting member.

3. A vehicle suspension system as claimed in claim 1, in which the push rod is connected at its other end to a wheel hub support member suspended from the vehicle chassis by suspension links.

4. A vehicle suspension system as claimed in claim 1, in which the airbag acts transversely of the centreline of the chassis.

5. A vehicle suspension system as claimed in claim 4, which includes two airbags disposed back-to-back.

6. A vehicle suspension system as claimed in claim 1, in which the airbag acts longitudinally of the chassis.

* * * * *

UNITED STATES PATENT AND TRADEMARK OFFICE
CERTIFICATE OF CORRECTION

PATENT NO. : 7,500,687 B2  
APPLICATION NO. : 11/363633  
DATED : March 10, 2009  
INVENTOR(S) : Valerian John Dare-Bryan Page 1 of 1

It is certified that error appears in the above-identified patent and that said Letters Patent is hereby corrected as shown below:

Title Page;

On the front page, please add the following paragraph:

"(30)   Foreign Application Priority Data

January 31, 2004 (GB)   0402200.0

January 31, 2005 (GB)   0501908.8

April 1, 2005 (EP)   05252077.2"

Signed and Sealed this

Eleventh Day of August, 2009

David J. Kappos  
*Director of the United States Patent and Trademark Office*